United States Patent
Siska

(10) Patent No.: US 7,395,240 B2
(45) Date of Patent: Jul. 1, 2008

(54) FINANCIAL PRODUCT AND COLLABORATIVE SYSTEM AND METHOD FOR PROVIDING AND MONITORING A FINANCIAL PRODUCT

(76) Inventor: Thomas G. Siska, 2 Hitching Post Dr., Rolling Hills Estates, CA (US) 90274

(*) Notice: Subject to any disclaimer, the term of this patent is extended or adjusted under 35 U.S.C. 154(b) by 1515 days.

(21) Appl. No.: 09/995,955

(22) Filed: Nov. 28, 2001

(65) Prior Publication Data
US 2002/0138415 A1  Sep. 26, 2002

Related U.S. Application Data

(63) Continuation-in-part of application No. 09/813,745, filed on Mar. 21, 2001, now Pat. No. 7,319,985.

(51) Int. Cl.
*G06Q 40/00* (2006.01)
(52) U.S. Cl. .............. 705/38; 705/35; 705/36; 705/37; 705/39; 705/40
(58) Field of Classification Search .......... 705/35, 705/36, 37, 38, 39, 40
See application file for complete search history.

(56) References Cited

U.S. PATENT DOCUMENTS

| 5,742,775 A | 4/1998 | King |
| 5,907,828 A * | 5/1999 | Meyer et al. ............ 705/4 |
| 6,148,293 A | 11/2000 | King |

(Continued)

FOREIGN PATENT DOCUMENTS

JP  2002073983 A  3/2002

OTHER PUBLICATIONS

"Investor Compensation Schemes", European Banker, n 140, p. N/A, Apr. 25, 1997.*

(Continued)

*Primary Examiner*—Nga B. Nguyen
(74) *Attorney, Agent, or Firm*—Schwartz Cooper Chartered

(57) ABSTRACT

A method and a Financial Product providing for Banks and other large Finance Companies (Intermediaries) to market and fund the Financial Product to its Customers (Customers) and potential Customers, whereby the entire Financial Product processes are administered by a contracted Finance Company (Contractor) that possess loan, leasing and/or factoring specialty expertise that the Intermediary does not have or cannot duplicate cost effectively. The Contractor will indemnify and/or insure the Intermediary from loss of principle and interest, thereby eliminating all risk to the Intermediary, or alternatively the Contractor will indemnify the Intermediary, and further guarantee the indemnification through an insurance company in the form of a performance bond, or another third party in the form of a put option. In a further alternative the indemnification may be entirely in the form of a performance bond or put option. Since the Intermediary provides money for the Financial Product, the cost will be in most cases lower than the cost of money the Contractor can provide directly. The Contractor is able to drastically reduce its marketing costs as volume gets funneled in from its customer Intermediaries. The Customer benefits from having easier access to the various Financial Products and a lower price due to this process. The Intermediary can now serve its customers better, employ funds more efficiently, earn fees for providing marketing services benefitting the Contractor, all while completely eliminating the risk of loss on the contracted Financial Products.

36 Claims, 6 Drawing Sheets

U.S. PATENT DOCUMENTS

| | | | |
|---|---|---|---|
| 6,233,566 B1 * | 5/2001 | Levine et al. | 705/36 R |
| 6,460,021 B1 * | 10/2002 | Kirksey | 705/35 |
| 7,028,007 B1 * | 4/2006 | Abrahams et al. | 705/38 |
| 7,319,985 B2 | 1/2008 | Siska | |
| 2001/0056399 A1 | 12/2001 | Saylors | |
| 2002/0091630 A1 | 7/2002 | Inoue | |

OTHER PUBLICATIONS

Hanc, "Deposit insurance reform: State of the debate", FDIC Banking Review, v 12, n 3, p. 1-26, 1999.*

"Structured finance: News in brief", Euroweek n710 pp. 54-55, Jul. 6, 2001.*

Shatto, "Credit and Venture Capital for Small Business Investment", Texas Business Review v54n5 pp. 267-271, Sep./Oct. 1980.*

* cited by examiner

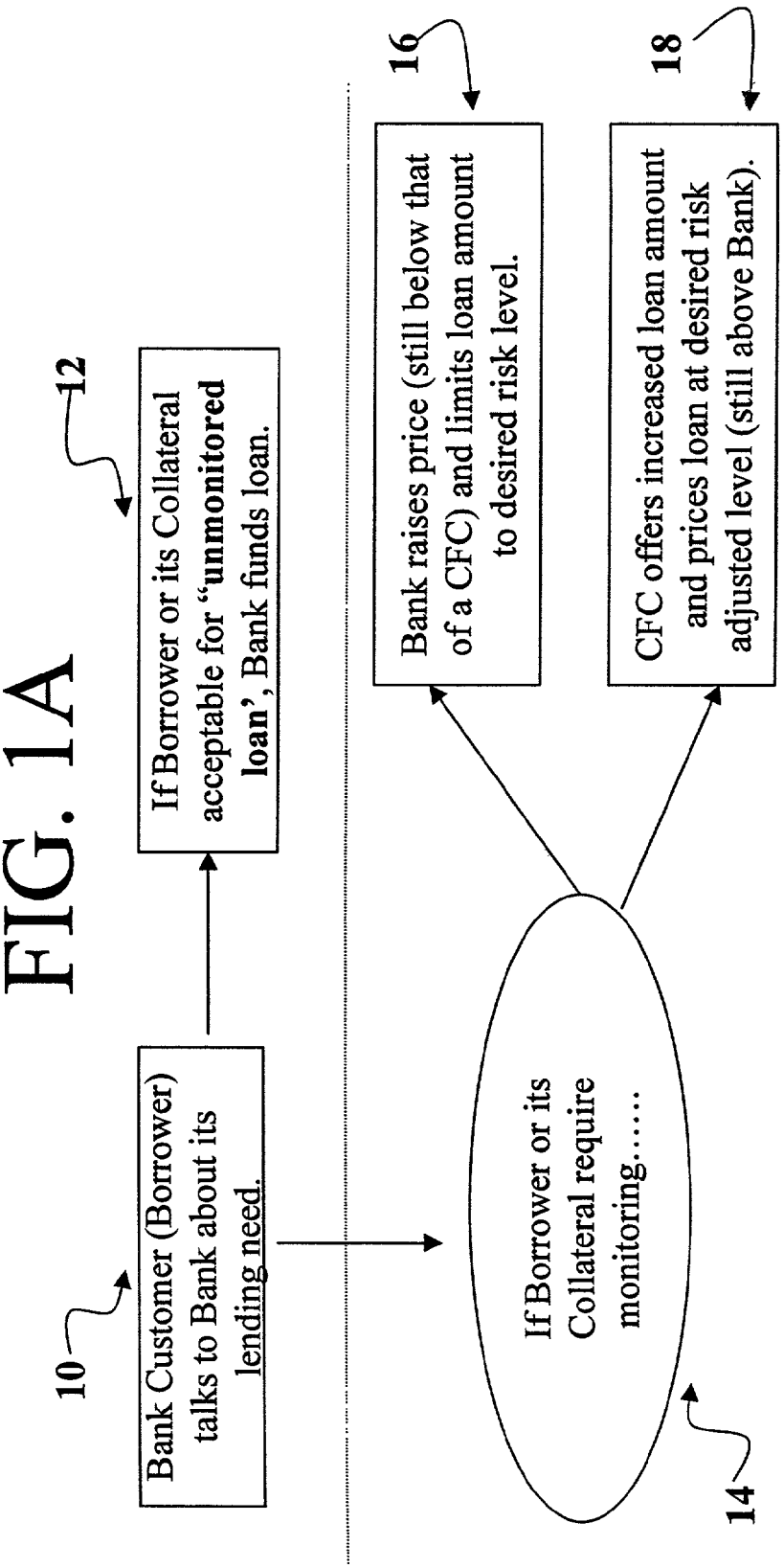

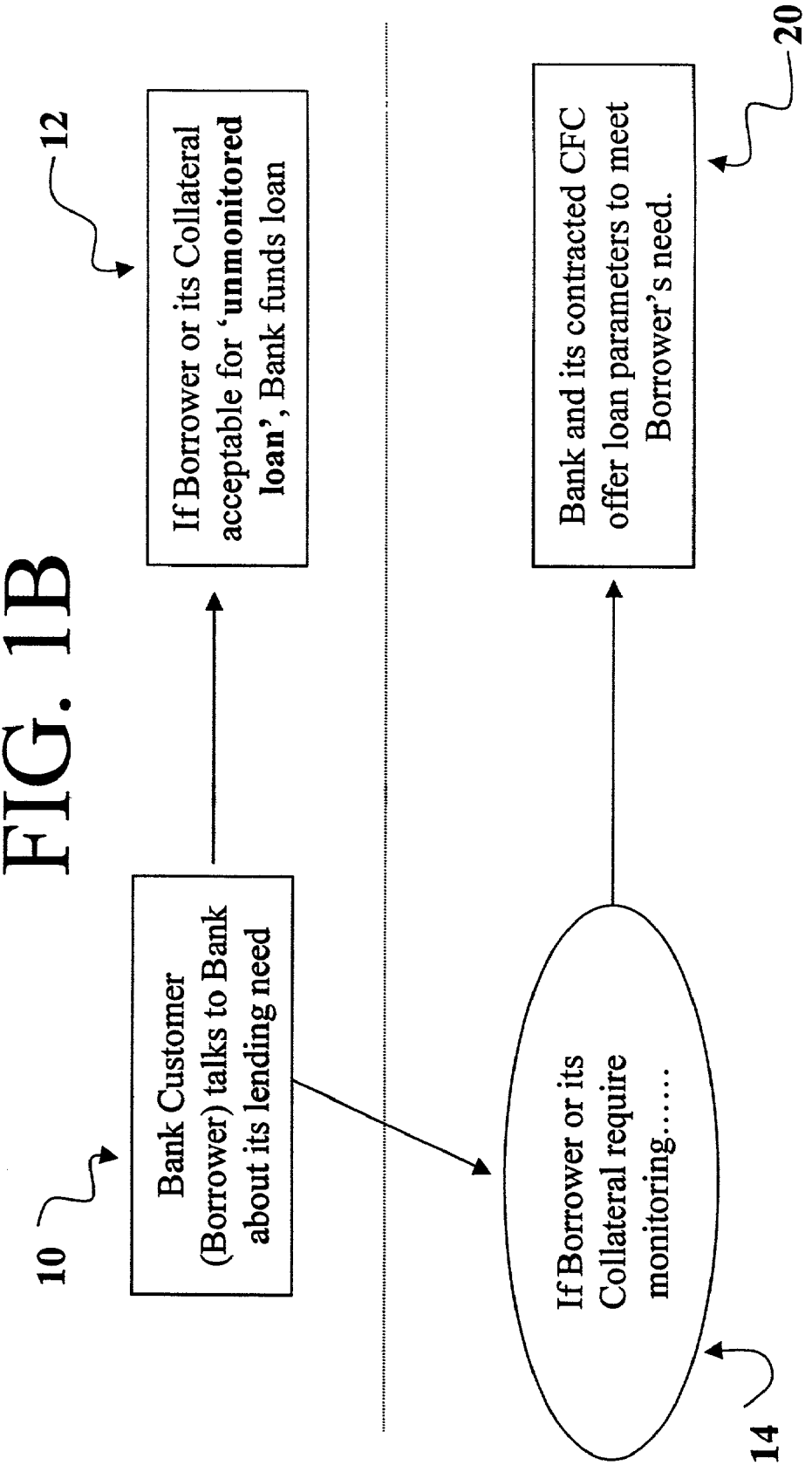

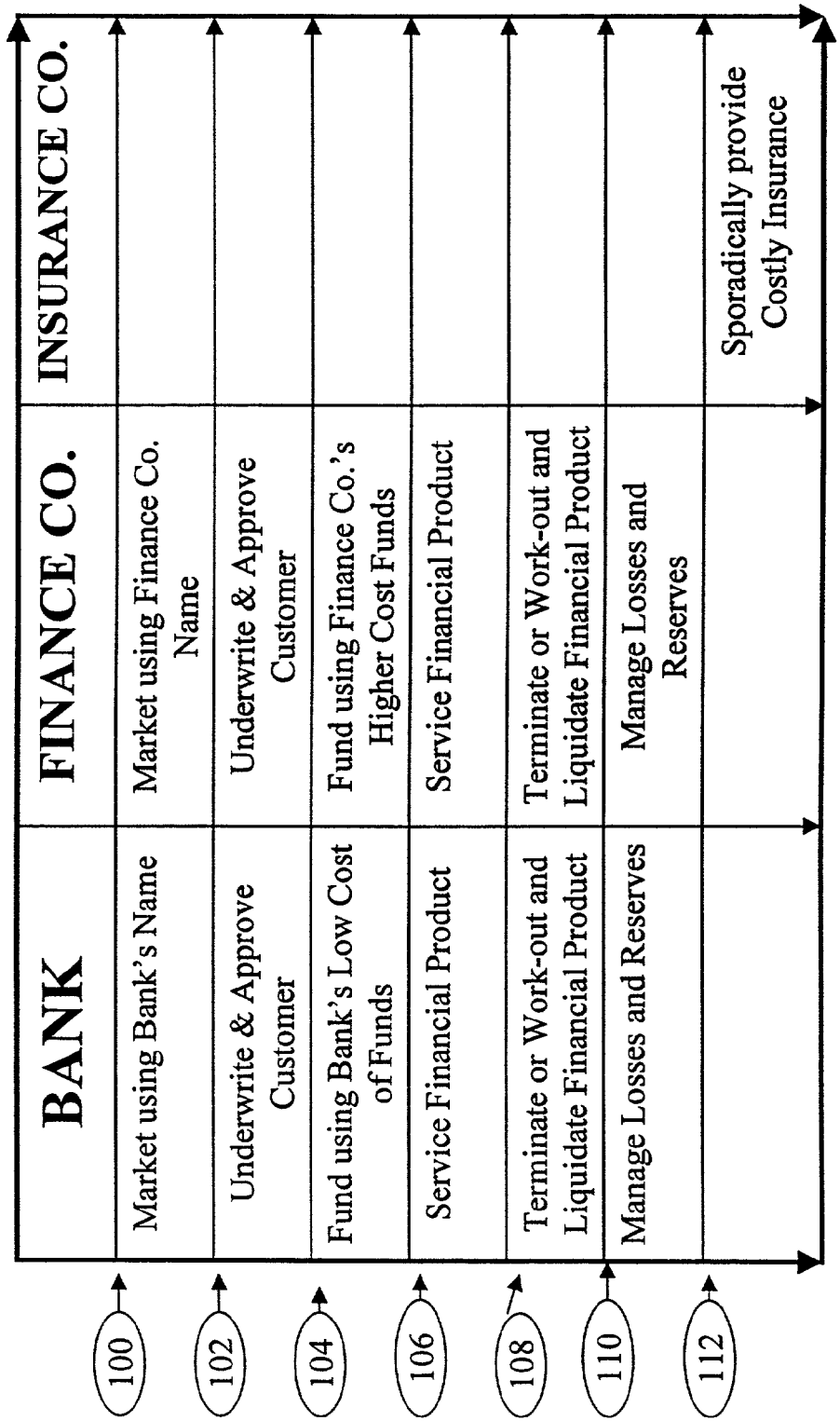
FIG.2A - PRESENT DELIVERY PROCESS (in general)
*What once was two competitors performing the same process while possessing different strengths...*

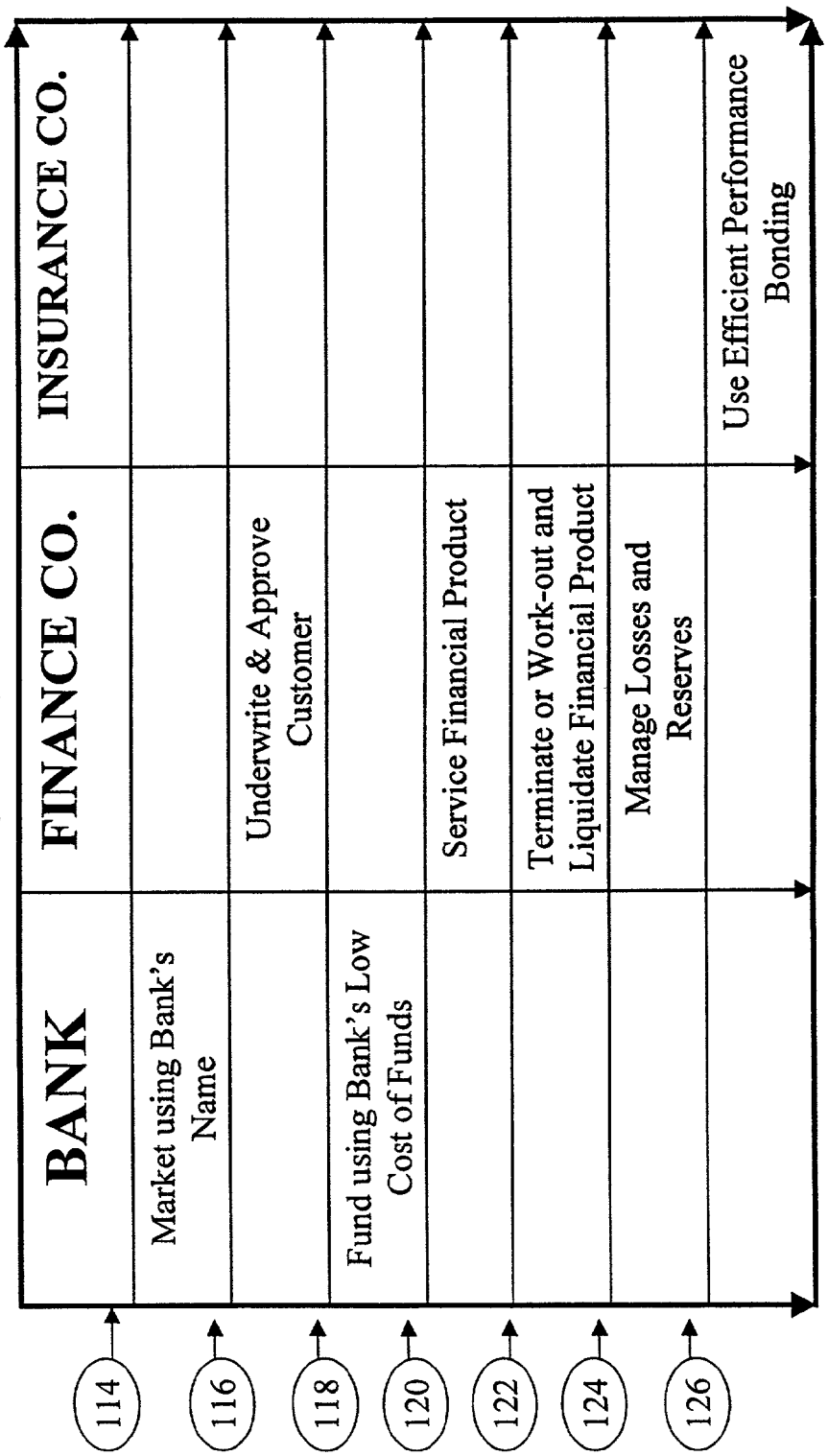

FIG. 3A – PRESENT MONITORING PROCESS (Detailed example)

| BANK | CFC |
|---|---|
| 22 — Borrower submits collateral. | 38 — Borrower submits collateral. |
| 24 — Bank reviews collateral. | 40 — CFC reviews collateral. |
| 26 — Bank funds money into Borrower's checking account based on 'advance parameters'. | 42 — CFC funds money *from their bank account into the Borrower's checking account usually in another bank* based on 'advance parameters'. |
| 28 — Borrower's customers pay Accounts Receivable to Bank. | 44 — Borrower's customers pay Accounts Receivable to CFC. |
| 30 — Bank reduces 'advance' amount. | 46 — CFC reduces 'advance' amount. |
| 32 — Borrower submits updated collateral. | 48 — Borrower submits updated collateral. |
| 34 — Bank re-advances money into Borrower's checking account. | 50 — CFC re-advances money into Borrower's checking account. |
| 36 — Cycle continues. | 52 — Cycle continues. |

FIG. 3B — COLLABORATIVE MONITORING (Detailed example)

BANK IN CONJUNCTION WITH THEIR CONTRACTED CFC

54 — Borrower submits Collateral to Bank's processing center (either in hard copy or computer-to-computer via the internet or direct modem) which resides with the CFC.

56 — CFC reviews Collateral.

58 — CFC instructs Bank to fund money into Borrower's checking account.

60 — Borrower's Customers pay Accounts Receivable to Bank.

62 — CFC reduces 'advance' amount.

64 — Borrower submits updated Collateral as in Step 1.

66 — CFC instructs Bank to re-advance money into Borrower's account.

68 — Cycle continues for the length of the relationship.

FINANCIAL PRODUCT AND COLLABORATIVE SYSTEM AND METHOD FOR PROVIDING AND MONITORING A FINANCIAL PRODUCT

RELATED APPLICATIONS

This is a continuation-in-part application of Ser. No. 09/813,745 filed Mar. 21, 2001 now U.S. Pat. No. 7,319,985.

TECHNICAL FIELD

The present invention is generally directed to a financial product and to a system or method for collaboratively providing a full range of financial products, and more specifically, the invention is directed to a method of enabling an Intermediary or first institution, to collaborate with a Contractor or second institution, to provide a financial product in which the Contractor administers the financial product and indemnifies the Intermediary against risk.

BACKGROUND OF THE INVENTION

Presently, Banks and large Finance Companies (herein "Intermediaries") and Niche Finance Companies (herein "Contractors,"—in some instances, large Finance Companies may also act as a Contractor) all provide financial products, for example loans, leases and/or factoring programs (herein "Financial Products") directly to Customers. Typically, Intermediaries have a money cost advantage over Contractors by virtue of their size and financial strength. In this regard, Banks have the further advantage of being Depository Institutions. Additionally, Intermediaries also have a marketing cost advantage over Contractors brought about by their "brick-and-mortar" branch networks and the positive perception Customers have of a Bank or large Finance Company.

Because of the particular advantages Intermediaries possess over Contractors, Intermediaries tend to specialize in low cost (which assumes low risk) Financial Products. Due to the typically high quality of the Customer or its collateral, such low cost Financial Products require no monitoring whatsoever, or only passive monitoring in some cases. Intermediaries will also compete for higher risk Financial Products (i.e., those requiring more active monitoring), especially when the economy is doing well.

Contractors typically enjoy advantages over Intermediaries in terms of products offered, geography (i.e., ability to service Customers without regard to physical location) and expertise in handling certain types of Financial Products. As such, Contractors tend to specialize in higher margin (which assumes higher risk) Financial Products. Part of the "higher" margin goes to programs such as loan loss reserves, and part to more sophisticated Financial Product monitoring and structuring mechanisms required by the risky nature of the Customer or its collateral. The remainder is higher profit for the higher risk (if all goes well). Contractors will also compete for lower risk Financial Products (those requiring passive monitoring), especially when Intermediaries invade the Contractor's territory during good economic times.

The fact that Intermediaries and Contractors offer different advantages to the market is helpful to address most every Customer's needs. However, it becomes problematic when money is easily available (supply of money is high) and Customers' need to borrow lessens (demand for money is low), such as occurs during a good economy. During these healthy economic times, an Intermediary's desire to employ its abundance of funds causes it to take more risk, even without the expertise to do so profitably.

As Intermediaries pull Customers from a higher risk market with already decreased demand, Contractors lower their rates in an effort to keep business flowing. This reaction either lowers profits or forces under-funded loan loss reserves for the Contractors. As good economic times continue, the competition escalates to the point where margins are so low and risk so high that "bad" Loans are literally booked. The longer these conditions exist, the more "bad" Loans build up on the books of the participants.

Some may argue that all of this competition is good for the Customers. However, history has proven that this is not the case.

While Customers may enjoy higher debt levels and lower prices as a result of the competition, as the economy slows, so do revenues. Thus, under normal debt levels, Customers' profits would suffer, but little else. However, under the higher debt levels offered by the "uneven" competitors, Customers have a difficult time meeting debt service payments. Intermediaries and Contractors with higher risk, lower returns, and under-funded loss reserves, declare Customer defaults at a record pace. In other words, everyone loses.

One financial product popular in the late 1980's and early 1990's, called "Securitization," was an attempt to solve funding issues for both Contractors and Intermediaries. Entities could fund Financial Products and then subsequently securitize them (i.e., sell the Financial Products to a shell corporation owned in whole or in part by the entities initially providing the Financial Products); thereby removing the asset and corresponding liability from their books. This allowed participants to fund more Financial Products without having to raise equity levels. As Securitization grew in popularity and competition increased, it was subsequently marketed as a "risk management" tool as well as a finance tool. However, "Securitization" actually increased risk because the same participant structured and monitored the Financial Product, and was ultimately on the hook for any losses. Only now, the participant was able to grow beyond the prudent level of its equity base. As such, in the late 1990's, the Securitization market collapsed as participants went bankrupt and their investors lost a lot of money.

Even with the Securitization failure fresh in their minds, the Intermediary community continues to dedicate resources in the search to leverage their distribution capabilities (i.e., marketing), and their main resource, low cost of funds, throughout the lending market. However, to do so successfully the Intermediaries need to find a way to manage (i.e., lower or eliminate) their risk.

During the same time that Loan Securitization became popular, several niche finance companies introduced "partnering programs" allowing Intermediaries to utilize their marketing and low cost funds in tandem with the Financial Product structuring and monitoring expertise of the niche finance company. These "partnering" products seemed to be an improvement over Securitization in that risk is shared between the participants. However, Intermediaries were earning less than half the revenue associated with the Financial Product while remaining exposed to at least half of the risk (and in some cases more than half of the risk). The niche finance companies that push these programs are, on the other hand, quite comfortable earning premium risk adjusted returns at the Intermediaries' expense.

Intermediaries are continuously looking for products that reduce or eliminate risk. Intermediaries are also interested in being able to provide a full range of Financial Products for its customers, even in areas the Intermediary normally would avoid if acting solely on its own. For example, a particular Intermediary may on its own, avoid providing Financial Products for a specific industry or market (e.g., construction loans).

According to the present invention, Intermediaries and Contractors can effectively collaborate to their mutual benefit, taking advantage of each other's strengths to provide a full range of Financial Product for the Intermediaries customers. This invention opens the door for increased access for the Contractors to the Customers (and vice versa), while eliminating risk for the Intermediaries. The lower cost of funds provided by the Intermediary makes the collaborative product more competitive while saving money for the Customer.

SUMMARY OF THE INVENTION

The present invention is directed to a unique method of collaborating between an Intermediary and a Contractor (and possibly other third parties) to provide a Financial Product to a customer, and to a unique Financial Product resulting from the method. As used herein, the Financial Product, may be for example one of the following products or services offered by an Intermediary or Contractor: commercial loans, consumer loans, Federal and Municipal loans, currency exchange, letters of credit, installment credit, leasing, and factoring. Certain of these Financial products (as created and modified in accordance with the present invention) can be traded on a secondary market in a manner similar to products like a home mortgage.

In one embodiment, the Financial Product can be provided in the name of the Intermediary to its customers, or alternatively, in the name of the Contractor to its customers. In its basic form, the invention comprises an Intermediary providing money for the Financial Product, and the Contractor servicing the Financial Product. Servicing the Financial Product may include one or more of the following activities: underwriting, examining, investigating, pricing, structuring, approving, documenting, negotiating, closing, administering, managing, risk managing, monitoring, collecting payments, liquidating, or any other activity necessary to completely service the Financial Product. The Contractor, either on its own or with a third party such as an insurance company, indemnifies the Intermediary against risk for providing money for the Financial Product. One manner that an insurance company can assist in such indemnification is by providing a performance bond backing up the Contractor's guarantee against such risk.

In another embodiment, the present invention is directed to all financial products not handled by or outside the expertise of an Intermediary, such as higher risk loans and niche lending, and to a system or method for providing the Financial Product through an Intermediary. The invention strategically links Intermediaries and Contractors together in the distribution to Customers of a single product line. The single product line addresses all of the Customer's Financial Product needs while accessing the specific advantages provided by the Intermediary and the Contractor. The result is a financial product that is easier to access by the Customer (saving the Customer time and money in obtaining the financial product), cheaper for the Customer (in terms of rate or cost of the financial product), less risky for the Intermediary (in terms of possible default by the Customer), and cheaper to market and fund for the Contractor (who utilizes the marketing resources and lower cost of funds of the Intermediary).

The present invention fulfills the Intermediaries desire to provide as many financing alternatives as its Customers want, while simultaneously enhancing the Contractors desire to market and fund its products as cost effectively as possible. The resulting product obtained by the collaboration between the Intermediary and the Contractor, fulfills the Customer's desire to easily and cheaply access a full array of Financial Products from one institution while eliminating risk for the Intermediary.

Although the idea of offering a full array of Financial Products through an Intermediary has been attempted before, such products have never been successful. This is because the Intermediary on its own, lacked the expertise and structure to profitably maintain certain types of Financial Products. Moreover, when partnered with other entities, the Intermediary still faced too much risk without enough return to justify the risk. As the Intermediaries suffered losses on such previously attempted Financial Products, the programs disappeared.

The Intermediary alternatively could avoid risk by not using its own funds. However, this results in a higher cost to the Customer when using the more expensive funds of the Contractor.

Another alternative the Intermediary has to eliminate risk is to insure the Financial Product (or have the Customer provide the insurance). Individual or portfolio loan insurance is expensive and usually causes the price of the product to increase. Even in cases where the resultant total cost is lower than other, present products, the invention's cost will still be considerably lower due to the new collaborative process. Loan or portfolio insurance also generates a perverse incentive. That is, the servicer (i.e., the Intermediary in this example), which is the primary risk manager, is NOT the primary party at risk, the insurance company is. Further, if the Intermediary believed it could successfully service the Financial Product (which includes risk management), it wouldn't need to insure it in the first place.

Until the present invention, an Intermediary has never been able to offer and fund a Financial Product that is serviced by experienced Contractors at a cost below present market, without facing any of the risk itself. By combining the biggest advantages of Intermediaries (built in marketing, and low cost of funds) and that of Contractors (Financial Product servicing expertise), Customers can enjoy lower priced Financial Products while Intermediaries eliminate the risk and Contractors gain marketing power at little cost. Competitors (i.e., Intermediaries in conjunction with their Contractors) will now all compete on equal footing. In this regard, competition does not get eliminated, it merely gets shuffled around so that all market participants can benefit.

In accordance with one embodiment of the invention, a method of providing a Financial Product to a Customer comprises the step of offering a Financial Product through a first institution. This first institution may be an Intermediary such as a bank. For example, it may be the Customer's bank that the customer uses for other banking needs. The method further includes providing the Financial Product to the Customer, preferably in the name of the first institution. That is, entering into a Financial Product agreement with the Customer. The method further includes the first institution providing money for the Financial Product, and collaborating with a second institution for the second institution to service or administer the Financial Product. This is done typically for a Financial Product not presently offered by the first institution, such as higher risk loans where the customer or its collateral require monitoring within the expertise of the second institution. The second institution may be a Contractor, such as a commercial finance company ("CFC"), that has more experience dealing with and administering Financial Products of this type. This may include setting aside money (i.e., loan loss reserves) in the case of defaults by customers.

As provided above, the method comprises obtaining the money provided for the Financial Product from the first institution. Certain institutions, such as banks, typically have access to money at a low cost (as compared to that available to a commercial finance company). This step allows one or more of the parties to the transaction to benefit from such low cost. Additionally, the method includes obtaining indemnification for the first institution of all risk for providing the money for the Financial Product. The indemnification may be obtained entirely from the second institution, or in part from the second institution with the remaining portion provided by a third party, such as an insurance company. The collaboration between the first institution and the second institution in this manner, allows the first institution to obtain the benefit of being able to provide the desired Financial Product (and thus have a more complete line of products to offer) without the risk or administrative activity normally associated with such a Financial Product. The second institution obtains the advantage of the typically greater marketing power of the first institution in reaching Customers. The second institution also obtains an advantage by being more price competitive by utilizing the first institutions lower cost of funds. The Customer also obtains an advantage in being able to have easier access to all of the Financial Products it may require, as well as potential savings resulting from the collaboration. Although the Financial Product is offered through the first institution, the Financial Product can be made in the name of the first institution or the second institution.

In a separate embodiment the invention is a method of providing a Financial Product to a customer comprising the steps of offering a Financial Product through a first institution, providing the Financial Product to the customer, providing money for the Financial Product; and servicing or administering the Financial Product by a second institution. The method further includes obtaining the money provided for the Financial Product from the first institution, and providing indemnification for the first institution of all risk for providing the money for said Financial Product. The indemnification may be obtained entirely from the second institution, or in part from the second institution and in part from a third party such as an insurance company.

In a still further embodiment, the invention is a method of distributing and servicing a plurality of Financial Products marketed by an Intermediary company. The method comprises the steps of offering a plurality of Financial Products through an Intermediary company, the Financial Products including low risk loans and high risk loans that require differing levels of monitoring, marketing the plurality of Financial Products to a plurality of potential customers, providing a customer a high risk Financial Product, and collaborating with a Contractor to actively service the high risk Financial Product. The Intermediary company, like the first institution, may be a banking institution. Similarly, the Contractor may be a commercial finance company.

The method further comprises the step of providing money for the high risk Financial Product from the Intermediary company, and obtaining indemnification and/or insurance for the Intermediary company against risk associated with providing the money for the high risk Financial Product. The Contractor may indemnify and/or insure the Intermediary company against 100% of the risk on its own, or partner with a third party, such as an insurance company, to collectively indemnify the Intermediary against 100% of the risk.

In yet a further embodiment of the invention, a method of providing and managing a Financial Product comprises the steps of offering a plurality of Financial Products through a bank to a plurality of potential Customers. The Financial Products may be a full range of products including Financial Products directly offered by the bank (i.e. Financial Products traditionally provided by the bank) and contracted Financial Products. "Contracted Financial Products" being those products not normally offered by the bank, that are intended to be administered by a Contractor. The method further comprises marketing of the plurality of Financial Products by the bank to the plurality of potential Customers, providing a contracted Financial Product to a customer, and possibly obtaining collateral from the Customer for the contracted Financial Product. Additionally, the method includes supplying money for the contracted Financial Product from the bank, collaborating with a finance company, such as a commercial finance company, to actively service or administer the high risk Financial Product provided to the Customer; and obtaining indemnification and/or insurance for the bank against all risk associated with supplying money for the high risk Financial Product from the finance company.

In a further embodiment the invention comprises a contracted Financial Product.

The contracted Financial Product comprises money supplied from a first institution to a Customer. The money supplied from the first institution is guaranteed and insured by a second institution against risk of default of the Financial Product by the Customer, and the Financial Product is actively serviced or administered by the second institution. The product may also include collateral supplied by the Customer for the money supplied from the first institution. Again, the first institution may be a bank and the second institution may be a finance company.

In yet another embodiment the invention comprises a customer or customers approaching its preferred Provider (i.e., Intermediary), the one that typically is easiest to access and cheapest to access, for a Financial Product. The Intermediary evaluating the needs of the customer, and identifying a Financial Product not directly provided by the Intermediary. Because the Intermediary desires to service the customer's needs and not lose or damage its relationship with the customer, the method includes the Intermediary executing a contract for a Contractor to provide the Financial Product to the customer in the Intermediary's name (i.e., a contracted Financial Product). This fits in with the Contractor's desire to be made aware of customers in search of a Financial Product that the Contractor provides without the expenditure required for marketing the Financial Product. This so-called "Private Label Loan Product" may be less expensive for Customers than going directly to the a Contractor through the Contractor's sales and marketing department. Moreover, the Financial Product provides the same margin (or better) for administering Contractors, and fee income or "risk adjusted" premium yields on funds employed or both to participating Intermediaries.

The method and Financial Product, provides for a customer (i.e., Customer) to obtain a Loan from an Intermediary through a Contractor, thus saving the Contractor sales and marketing expenses. The Intermediary funds the Loan per instructions from the servicing Contractor utilizing the Intermediary's low cost of capital. The Intermediary earns a risk-adjusted premium on funds employed for providing marketing services to the Contractor or earns a straight fee income, or a combination of both. The wire fees normally incurred when the funds originate from the Contractor's bank account, are avoided throughout the life of the Financial Product if the Intermediary is a Bank. If the Intermediary is a bank, it continues to earn interest on checking account balances of the Customer. The Customer's Financial Product costs are lower due to the expense savings and revenue enhancements provided by this method and product.

The Intermediary and Contractor will negotiate the Intermediaries marketing fees and/or risk adjusted premium earned on funds employed in the Financial Product. This can be on a contract wide basis or on a Financial Product-by-Financial Product basis. The Contractor provides risk guarantees either directly (e.g., through simple contract language, where the credit rating or financial condition of the Contractor is deemed by the Intermediary as supporting the Contractor's guarantee) or through a third party insurance contract acceptable by the Intermediary, or through a combination of both.

In a further alternative embodiment of the invention, a method of providing a Financial Product to a customer comprises the steps of offering a Financial Product through a first institution; providing the Financial Product to said customer; providing money for the Financial Product; collaborating with a second institution for the second institution to service the Financial Product; obtaining the money provided for the Financial Product from the first institution; and, obtaining indemnification for the first institution of all risk for providing the money for the Financial Product and guaranteeing said indemnification at least in part is in the form of a performance bond that may be issued by an insurance company.

In another alternative embodiment a method of providing a Financial Product to a customer comprises the steps of offering a Financial Product through a first institution; providing the Financial Product to the customer; providing money for the Financial Product; obtaining the money provided for the Financial Product from the first institution; providing indemnification for the first institution of all risk for providing the money for the Financial Product, wherein the indemnification at least in part is in the form of a performance bond; and, servicing the Financial Product by a second institution. The indemnification may be obtained in part from the second institution, and in part from an insurance company. The insurance company would provide the performance bond.

In yet another embodiment a method of distributing and servicing a plurality of Financial Products marketed by an Intermediary company comprises the steps of offering a plurality of Financial Products through an Intermediary company, the Financial Products including Financial Products provided directly by the Intermediary company and Financial Products not provided directly by the Intermediary company; marketing the plurality of Financial Products to a plurality of potential customers; supplying a customer a Financial Product not directly provided by the Intermediary company; collaborating with a Contractor to actively service the Financial Product; providing money for the Financial Product from the Intermediary company; and, obtaining indemnification for the Intermediary company against all risk associated with providing money for the Financial Product, wherein the indemnification provided by the Contractor is backed up in the form of a performance bond.

The Contractor may provide indemnification for the Intermediary company against a first part of the risk associated with providing money for the Financial Product, and an insurance company may provide indemnification for the Intermediary company against a second part of the risk associated with providing money for the first Financial Product. The insurance company may provide the performance bond.

In another embodiment a method of providing a Financial Product to a customer comprises the steps of offering a Financial Product through a first institution; providing the Financial Product to the customer; providing money for the Financial Product; collaborating with a second institution for the second institution to service the Financial Product; obtaining the money provided for the Financial Product from the first institution; and, obtaining indemnification for the first institution of all risk for providing the money for the Financial Product wherein the indemnification at least in part is in the form of a put option obtained from a third party.

The present invention is also directed toward a contracted Financial Product comprising money supplied from a first institution to a customer, the money supplied from the first institution insured against risk of default of the Financial Product by the customer at least in part by a performance bond. The contracted Financial Product is actively serviced by a second institution.

Alternatively, a contracted Financial Product may comprise money supplied from a first institution to a customer, the money supplied from the first institution insured against risk of default of the Financial Product by the customer at least in part by a put option.

In yet another embodiment, a method of providing a financial product comprises using a performance bond to support a financial services company's guarantee to a money supplier for the use of money in a contracted service.

The invention also is directed to a method of providing a Financial Product to a customer comprising the steps of: providing money for a Financial Product by a first institution; offering said Financial Product through a second institution; servicing said Financial Product by said second institution; providing said Financial Product to a customer; and obtaining indemnification for said first institution against all risk for providing said money for said Financial Product. The method may also include the step of providing said Financial Product in the name of the first institution. Again, indemnification may be obtained from said second institution, and may be guaranteed by a third party. Also, the first institution may be a bank, the second institution may be a finance company, and the third party may be an insurance company. The insurance company can provide said guaranty of said second institution's indemnification to said first institution in the form of a performance bond in favor of said first institution.

Also disclosed is a method of providing a Financial Product to a customer comprising the steps of: providing money for a Financial Product by a first institution; providing a customer for said Financial Product through a second institution (i.e., a customer of the second institution); servicing of said Financial Product by said second institution; and said second institution obtaining indemnification for said first institution against all risk for said providing money for said Financial Product. The method may include providing said Financial Product in the name of said first institution.

In another embodiment, the invention is a method of providing a Financial Product to a customer comprising the steps of: providing a customer a Financial Product through a first institution; providing money for said Financial Product from said first institution; collaborating with a second institution for said second institution to service said Financial Product; said second institution obtaining indemnification for said first institution against all risk for providing said money for said Financial Product. Again, the method may include the step of providing said Financial Product in the name of the first institution, and wherein said indemnification is obtained entirely from said second institution. The indemnification obtained from said second institution may be guaranteed by a third party, such as an insurance company. The first institution may be a bank, and the second institution may be a finance company. The insurance company may provide said guaranty of said second institution's indemnification to said first institution in the form of a performance bond in favor of said first institution. Additionally, the method may comprise the steps of obtaining said Financial Product in the name of a further third party (or fourth party, i.e., an entity different than the insurance company) owned at least in part by one or both of said first institution and said second institution. For example the finance company may own 90% of the third party, and the Bank may own 10%.

Another embodiment of the invention comprises a method of providing a Financial Product to a customer comprising the steps of: offering a Financial Product through a first institution; collaborating with a second institution for said second institution to service said Financial Product; providing said Financial Product to a customer; obtaining money for said Financial Product from said first institution; and, indemnifying said first institution of all risk for providing said money for said Financial Product.

The invention also introduces the use of a Performance Bond for the purpose of backing up a guarantee of a Contractor to an Intermediary for the use of the Intermediary's name and money for the first time. The invention results in the lowest risk security ever produced by a non-government entity. Insurance or 'credit enhancement,' does exist and is used to protect a money source which therefore lowers the cost of money. However, the results are singular (since no collaboration exist) and marginal so the use is rare. Performance Bonding, as used by the invention as part of the collaborative effort, allows for many benefits provided by the invention, thereby making it more powerful, valuable and unique. While under normal circumstances, financial risk and financial return exist as a linear relationship, the invention (in certain of its embodiments) now creates an exponential relationship which practically eliminates risk to the Intermediary. In order for the Intermediary to suffer one cent of loss, the following must ALL occur: (1) the customer must default on the financial product; (2) the Contractor must suffer losses to the extent that it cannot honor its guarantee; and, (3) the losses remaining after the Contractor has paid what it could, must be so great as to bankrupt the insurance company that backed up the Contractor's guarantee. The aforementioned 'credit enhancement' insurance only serves as a second layer of protection in limited circumstances resulting in movement along the linear curve. The invention's Performance Bond serves as an unlimited third layer of protection, thus creating the exponential risk curve which all but completely eliminates risk to the money provider. Again, the Contractor, which exerts the most control over the risk of loss, is the primary risk taker; thereby removing the 'perverse incentive' which exists with all other loan insurance products.

Further aspects of the invention are disclosed in the detailed description of the preferred embodiment, the drawings and the claims.

BRIEF DESCRIPTION OF THE DRAWINGS

FIG. 1A is a schematic block diagram illustrating the present Financial Product process as it exists in the market today;

FIG. 1B is a schematic block diagram illustrating an embodiment of the present invention;

FIG. 2A is a schematic block diagram illustrating one example of a typical Financial Product servicing process (working capital line of credits) performed by an Intermediary and a Contractor in general;

FIG. 2B is a schematic block diagram illustrating a Financial Product servicing process of an Intermediary collaborating with a Contractor in accordance with the present invention in general;

FIG. 3A is a schematic block diagram illustrating one example of a typical Financial Product servicing process (working capital line of credits) performed by an Intermediary and a Contractor in detail; and, FIG. 3B is a schematic block diagram illustrating a Financial Product servicing process of an Intermediary collaborating with a Contractor in accordance with the present invention.

DETAILED DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1A, typically a Customer, in this case a Borrower, will initially contact an Intermediary, such as the Borrower's bank, about its lending needs as depicted in box 10. Box 12 depicts the situation where a Borrower requests a Financial Product in the form of a Loan that is deemed by the Intermediary to be within its present product line (i.e., risk appetite). Intermediaries are the best providers of low risk Loans because such Loans are the easiest to access and the cheapest due to the fact that Intermediaries possess the lowest cost of funds. In this regard, Borrowers are only willing to pay interest on a low risk Loan if the interest is low and the Loan is easy to obtain. Accordingly, such transactions are completed in the normal course of business.

Box 14 represents all Financial Product requests, in this case Loan requests, that are deemed risky enough to warrant expertise on the part of the Lender in administrating the Loan. As the market exists today, the Borrower has two primary options represented by boxes 16 and 18. The first option represented in box 16, is to obtain a Loan from the Intermediary. However, the Intermediary will then raise its price (e.g., rate of the Loan), typically still below that of a Contractor such as a commercial finance company, and will limit the amount of the Loan to keep the risk to the Intermediary in line with the return.

The other option available to the Borrower, represented by box 18, is obtaining a Loan from a Contractor. This Loan is typically more expensive than the Loan available from the Intermediary, due to the Contractor's higher cost of funds, and the fact that the Contractor has to spend more money on marketing in order to locate Borrowers and to get Borrowers to entertain a higher cost Loan. In order to compete, the Contractor will typically offer a larger Loan amount. In this regard, the increased risk to the Contractor is in line with the increased cost of the Loan.

The competition between unequal competitors, the Intermediary and the Contractor, for the "risky" Loan continues until the Borrower chooses. Each competitor push their own unique advantages to influence the Borrower's decision (i.e., an Intermediaries marketing and low cost of funds, and the Contractor's expertise and structure which allow for higher Loan amounts). During good economic times when money is in abundance, one of the competitors will match the other's advantage and provide the Loan, even to the detriment of themselves and the Borrower.

As the situation presently exists, the Borrower must choose one Loan type (box 16) or the other (box 18), but cannot have both. Much time and money is expended on the part of the Borrower to ascertain what options are available and what tradeoffs must be made when choosing one product over the other.

In accordance with the present invention, FIG. 1B illustrates the same initial scenario for low or no risk Loans with boxes 10' and 12'. However, for Loans that require expertise on the part of the Lender (i.e., the higher risk Loans), as depicted in box 14', the Borrower only needs to deal with its Intermediary. As illustrated in box 20, an Intermediary (in this case a Bank) in conjunction with its Contractor (e.g., a CFC) collaborate to provide the appropriate Loan for the Borrower's need.

In accordance with the present invention, the Borrower can obtain a higher risk Loan, i.e., one requiring more active servicing, from the Intermediary. The Intermediary collaborates or contracts with the Contractor for the Contractor to service or administer the Loan. In this regard, the Contractor uses its expertise in servicing higher risk Loans.

This arrangement takes advantage of each of the participant's strengths. The Contractor utilizes its expertise in servicing and handling higher risk Loans. In this regard, the Contractor is specifically set-up to handle this higher risk (e.g., Contractor's are typically structured to have and maintain significant loan loss reserves in the case of default on the Loan). The Intermediary utilizes its typically superior marketing capability to provide Borrowers for the higher risk Loans in which the Contractors specialize, and provides its low cost of funds. Thus alleviating the Contractors of the cost of marketing and higher cost of funds. These benefits derived by the Intermediary and the Contractor can be passed in part to the Borrower to lower the cost of the Loan and time spent finding the Loan.

The invention provides that the Intermediary is indemnified or insured against all risk associated with the Loan. This indemnification can be provided entirely from the Contractor. Alternatively, the indemnification can be provided in part by the Contractor, and in part by one or more third parties working with the Contractor. Thus, all of the risk is born by the Contractor (or the Contractor and the third parties), and not the Intermediary.

In one alternative an insurance company may use a 'performance bond' to support or back up the indemnification or guarantee of the Contractor. Alternatively other vehicles, such as a 'put option' can be provided by a third party to support or back up the indemnification or guarantee of the Contractor.

FIG. 2A depicts the steps, in general, needed to fully deliver a Financial Product. Box Row 100 begins, as do almost all business processes, with the Marketing of the Financial Product. While both Intermediaries and Contractors (herein, for purposes of example, Bank and Finance Company, respectively) utilize their internal resources to separately 'go to market', a Bank will most often have Customers approach it first, since Customers seeking Financial Products already have a banking relationship via their checking account. Also, it is understood that Banks possess a 'cost of funds' advantage over Finance Companies, thereby giving them a pricing advantage over their Finance Company competitors. Further, Banks are regulated giving Customers a sense of protection that they do not get from Finance Companies. So while they both 'go to market', much of the market goes to the Bank first. CLEAR ADVANTAGE TO THE BANK.

Box Row 102 represents Customer screening and approval. This begins the 'servicing' stage. It is obvious, when discussing Financial Products that are offered by a Finance Company but not by a Bank, to determine that the Finance Company possess expertise that the Bank does not. Further, each participating Bank will determine, on its own, if they should turn over the servicing on certain Financial Products to a contracting Finance Company. This will only happen in cases where the Bank knows that the Finance Company is better at servicing the particular Financial Product. CLEAR ADVANTAGE TO THE FINANCE COMPANY.

The actual funding of the Financial Product takes place as represented by Box Row 104. The cost advantage belongs to the Banks. Banks also provide checking accounts. Therefore, a Finance Company will need to move its money from its Bank to its Customer's Bank, adding an inefficient layer to the process. CLEAR ADVANTAGE TO THE BANK.

Box Rows 106, 108 And 110 disclose the remaining aspects of the 'servicing' process. Box Row 106 is the day-to-day activities needed to deliver the Financial Product to the Customer. Box Row 108 shows the closing of the relationship between the Customer and the provider of the Financial Product. Finally, behind the scenes, Financial Product providers need to properly manage their Loss Reserves and Losses in order to survive; represented here by Box Row 110. As pointed out when describing Box Row 102, if a Bank possessed the expertise to properly deliver a Financial Product, it would. Finance Companies exist because they do some things that Banks cannot. CLEAR ADVANTAGE TO THE FINANCE COMPANY.

Lastly, Box row 112 recognizes the existence of various Insurance Products that insure loans and loan portfolios. There is no fluid market for these products. This is primarily because of the 'perverse incentive' provided by these products. To explain the 'perverse incentive', firms that service Financial Products are the sole controllers of the risk. If they are no longer exposed to the risk due to the insurance, they now have less incentive to control it. Again, if the provider of the Financial Product doesn't feel it can control the risk, and therefore demands insurance, why would another entity with no control over the servicing of the risk want to assume the risk. This mostly explains why present insurance products are very costly and sporadically used.

FIG. 2B shows how, in general, the new collaboration provided by the invention works. The collaboration recognizes the natural existence of the advantages possessed by the two market participants and has specifically designed the new Financial Product to utilize them. The collaboration also brings the concept of insurance into the mix only after removing any 'perverse incentive', thus creating the closest thing to a risk free security ever produced by non-government entities.

Box Row 114 shows the Bank performing the Marketing function and doing so in its name. Box Row 118 has the invention accessing the lowest cost of funds possible, the Bank's. Box Rows 116, 120, 122, and 124 illustrate the use of the Finance Company for all aspects of 'servicing.' Again, obviously, Banks will only desire these services when they feel that the Finance Company clearly possesses expertise that the Bank does not and cannot duplicate cost effectively.

Finally, the invention brings in Box Row 126 the use of efficient Performance Bonding to 'back-up' the guarantee of the Finance Company. Utilized in this fashion, the 'insurance' has no 'perverse incentive'. This is because it is not being used to protect the risk manager, the Finance Company. The Performance Bond protects the Bank. The Performance Bond only pays once the Finance Company has exhausted all of its other resources in an attempt to pay the Bank back its funds lost due to losses. In other words, the Finance Company must first cease to exist, financially. Certainly, here, the Finance Company will feel no sense of relief from the presence of the 'insurance.'

FIG. 3A discloses a Loan servicing process, in detail, as is typical for an Intermediary, such as a Bank (boxes 22-36), and a Contractor, such as a CFC (boxes 38-52). In both instances the Borrower submits collateral (boxes 22 and 38) which is reviewed (boxes 24 and 40) by the respective financial institution. In the case of a Bank, the Bank funds money into the Borrower's checking account based on certain advance parameters set up by the Bank (box 26). These parameters may include advance limits up to 40% of inventory and 80% of accounts receivable balance. During the course of the Loan, the Borrower (or its customers) pays back the Loan amount (box 28), which reduces the amount of the Loan advanced by the Bank (box 30). If the Borrower requires additional funds, the Borrower submits updated collateral (box 32), after which the Bank provides the additional funds (box 34). This cycle repeats (box 36) as necessary.

In the case of the CFC, the CFC funds money from the CFC's bank account into the Borrower's bank account which is typically in another bank, based on its advance parameters. These parameters may be the same or similar to the bank's parameter, or may include certain other items, such as advance limits up to 50% of inventory and 85% of accounts receivable balance. Similar to the bank, the CFC's borrowers pay back the Loan amount (box 44) which reduces the amount advanced (box 46). The Borrower may also submit updated collateral (box 48) to get additional funds (box 50). Again, this cycle is repeated as necessary (box 52).

Since Contractors are not banks, Borrowers cannot obtain money directly from the Contractors. Instead, the Contractors must send funds to the Borrower's bank. This inefficiency costs the participants money in two ways. First, wiring money from one bank to another generates wire fees that must be borne by either the Borrower or the Contractor. Second, part of a bank's revenue stream by providing Loans is the interest earned by the Bank when holding a Borrower's money in the form of a non-interest or low interest bearing checking account. Since Contractors are not depository institutions, they cannot reap these benefits and must therefore make up for this loss of revenue by charging higher prices for their Loans or by making less money for the given risk taken.

FIG. 3B is an example of a servicing process, in detail in accordance with the present invention. A Borrower that needs the higher advance (as heretofor normally provided by the Contractor), can now obtain the advance without the burden of wire fees or loss revenue provided by interest earned on checking account balances when the Intermediary is the bank.

Preferably, the Borrower submits collateral to the banks processing center which resides with the Contractor (box 54). The Contractor reviews the collateral (box 56) and instructs the Intermediary to fund money into the Borrower's checking account (box 58). The Borrower or its customers, pay off the Loan back to the Intermediary (box 60), and the Contractor reduces the advanced amount owed (box 62). The Borrower may submit updated collateral (box 64), after which the Contractor instructs the Intermediary to provide additional funds (box 66). Again, this process repeats as necessary for the length of the relationship (box 68).

In its preferred form, the present invention will allow for the first time one or more of the following advantages: (1) Intermediaries the ability to market Loans in the Intermediary's name even though the Intermediaries are not the direct provider of such Loans; (2) Intermediaries to earn fees or premium risk adjusted capital returns in exchange for the marketing service provided the Contractors; (3) Intermediaries to completely eliminate risk associated with a Loan they distribute; (4) Borrowers to more easily secure Loans, especially high risk loans not normally available through an Intermediary; (5) Borrower's to secure Loans at a cost below that of Loans provided directly by Contractors; (6) Contractors to gain access to more Borrowers faster while reducing or eliminating marketing costs; (7) Contractors to fund Borrowers using the lower cost of funds provided from the Intermediary thereby making the product more competitive; and (8) Contractor's access is enhanced using the better or more well known name of the Intermediary. Additional, less obvious benefits, can also be achieved with the present structure. For example, wire transfer fees (i.e., those previously incurred when a Contractor provided money for a Loan) can be eliminated in those situations where the Intermediary is a bank. Also, Borrowers avoid the switching costs that would have occurred when circumstances changed, requiring the Borrower to jump from an Intermediary to a Contractor, or visa versa. Borrowers can also obtain standard Intermediary credit more easily because the Intermediary that distributes the Loan can monitor the Borrower's progress directly as an Intermediary borrower (even though the Contractor administers the Loan). Further, Intermediaries that are Banks can increase revenues through earnings on checking account balances holding the Loans. Intermediaries also enjoy intangible benefits resulting from improved borrower service by providing borrowers more product options and increasing their total borrower base.

While specific embodiments have been illustrated and described, numerous modifications are possible without departing from the spirit of the invention, and the scope of protection is only limited by the scope of the accompanying claims.

I claim:

1. A method of providing a Financial Product to a customer comprising the steps of:
    offering a Financial Product through a first institution;
    providing said Financial Product to said customer;
    providing money for said Financial Product;
    collaborating with a second institution for said second institution to service said Financial Product;
    obtaining said money provided for said Financial Product from said first institution; said first institution owning said Financial Product;
    providing indemnification by the second institution for said first institution against all risk for providing said money for said Financial Product; and,
    providing a guarantee by a third party to said first institution of said indemnification of said second institution for said first institution providing said money for said financial product.

2. The method of claim 1 further comprising the step of:
    providing said Financial Product in the name of the first institution.

3. The method of claim 1 wherein said third party is an insurance company.

4. The method of claim 1 wherein said third party provides said guarantee in the form of a performance bond.

5. The method of claim 1 wherein said first institution is a bank.

6. The method of claim 1 wherein said second institution is a finance company.

7. The method of claim 1 further comprising also offering the Financial Product by the second institution.

8. The method of claim 7 further comprising the steps of: obtaining said Financial Product in the name of said second institution.

9. The method of claim 1 further comprising the step of trading said Financial Product.

10. A method of distributing and servicing a plurality of Financial Products marketed by an Intermediary company comprising the steps of:
   offering a plurality of Financial Products through an Intermediary company, said Financial Products including Financial Products provided directly by said Intermediary company and Financial Products not provided directly by said Intermediary company;
   marketing said plurality of Financial Products to a plurality of customers and potential customers;
   supplying a customer a contracted Financial Product not directly provided by said Intermediary company;
   collaborating with a Contractor to service said contracted Financial Product; providing money for said contracted Financial Product from said Intermediary company, said Intermediary company owning said contracted Financial Product by virtue of providing said money; and,
   obtaining indemnification for said Intermediary company against all risk associated with providing money for said contracted Financial Product, wherein said indemnification at least in part is in the form of a performance bond.

11. The method of claim 10 further comprising said Contractor providing indemnification for said Intermediary company, and an insurance company providing a guarantee of said Contractor's indemnification for said Intermediary company for providing money for said contracted Financial Product.

12. The method of claim 11 further comprising said insurance company providing said performance bond.

13. The method of claim 10 wherein said Intermediary company is a bank.

14. The method of claim 10 wherein said Contractor is a finance company.

15. The method of claim 10 wherein said Contractor markets said contracted Financial Product.

16. The method of claim 10 further comprising the step of trading said Financial product.

17. A method of providing a Financial Product to a customer comprising the steps of offering a Financial Product through a first institution; providing said Financial Product to said customer; providing money for said Financial Product;
   collaborating with a second institution for said second institution to service said Financial Product;
   obtaining said money provided for said Financial Product from said first institution; and,
   obtaining indemnification for said first institution of all risk for providing said money for said Financial Product wherein said indemnification at least in part is in the form of a put option.

18. The method of claim 17 wherein said indemnification is obtained in part from said second institution and in part from a third party.

19. The method of claim 17 further comprising the step of trading said Financial product.

20. A method of providing a financial product comprising the steps of:
   providing a contracted service to a customer;
   providing money for the contracted service by a money supplier;
   using a performance bond issued by an insurance company to support a financial services company's indemnification to the money supplier against all risk for the use of the money in the contracted service.

21. The method of claim 20 further comprising the step of trading said Financial product.

22. A method of providing a Financial Product to a customer comprising the steps of:
   providing money for a Financial Product by a first institution;
   offering said Financial Product through a second institution;
   servicing said Financial Product by said second institution;
   providing said Financial Product to a customer;
   obtaining indemnification for said first institution against all risk for providing said money for said Financial Product; and
   providing a guarantee from a third party to said first institution of said indemnification of for providing said money for said Financial Product.

23. The method of claim 22 wherein said third party is an insurance company.

24. The method of clam 22 wherein said indemnification is obtained from said second institution.

25. The method of claim 22 wherein said first institution is a bank.

26. The method of claim 22 wherein said second institution is a finance company.

27. The method of claim 23 wherein said insurance company provides said guaranty of said second institution's indemnification to said first institution in the form of a performance bond in favor of said first institution.

28. The method of claim 22 wherein said Financial Product is a high risk Financial Product.

29. A method of providing a Financial Product to a customer comprising the steps of:
   offering a Financial Product through a first institution;
   collaborating with a second institution for said second institution to service said Financial Product;
   providing said Financial Product to a customer;
   obtaining money for said Financial Product from said first institution; and, indemnifying said first institution of all risk for providing said money for said Financial Product, wherein said indemnification is obtained in part from said second institution and in part from a third party.

30. The method of claim 29 further comprising the step of providing said Financial Product in the name of the first institution.

31. The method of claim 29 wherein said indemnification is obtained entirely from said second institution.

32. The method of claim 29 wherein said first institution is a bank.

33. The method of claim 29 wherein said second institution is a finance company.

34. The method of claim 29 wherein said third party is an insurance company.

35. The method of claim 34 further comprising said insurance company providing a performance bond to insure said first institution against said risk.

36. The method of claim 29 further comprising the step of trading said Financial product.

* * * * *